United States Patent [19]

Schwartz

[11] Patent Number: 5,568,697
[45] Date of Patent: Oct. 29, 1996

[54] NET-HANDLE SEINE

[76] Inventor: Steven S. Schwartz, 3123 S. Boston, Denver, Colo. 80231

[21] Appl. No.: 520,597

[22] Filed: Aug. 29, 1995

[51] Int. Cl.$^6$ ............................................. A01K 77/00
[52] U.S. Cl. ..................................... 43/14; 43/12
[58] Field of Search ...................... 43/7, 11, 12, 14, 43/134; 209/417, 418, 419; 119/245, 264

[56] References Cited

U.S. PATENT DOCUMENTS

| | | | |
|---|---|---|---|
| 2,669,798 | 2/1954 | Hesch | 43/12 X |
| 2,724,920 | 11/1955 | Boehm | 43/12 |
| 3,150,460 | 9/1964 | Dees | 43/12 X |
| 3,699,700 | 10/1972 | Kinsell | 43/14 |
| 3,882,624 | 5/1975 | Pityo | 43/12 |
| 4,653,214 | 3/1987 | Cline | 43/14 |
| 4,932,150 | 6/1990 | Sher | 43/14 X |
| 5,157,854 | 10/1992 | Rumsey, Jr. | 43/12 |

*Primary Examiner*—Joseph J. Hail, III
*Assistant Examiner*—Jay A. Stelacone
*Attorney, Agent, or Firm*—Steven S. Schwartz

[57] ABSTRACT

An improved way of storing, accessing, and deploying a flyfishing seine net. A fine, lightweight seine net is transported in a compacted manner inside a small nylon pouch. This pouch compartment is attached to a circular-shape elasticized strap which slides up a landing net handle and is secured at the top, unused portion of the handle with a Hook & Loop fastening design. The seine net employs an elasticized band around a portion of its perimeter whereby it stretches, overlaps, and secures to the oval-shape frame of the landing net without tying.

8 Claims, 7 Drawing Sheets

NET-HANDLE SEINE

BACKGROUND OF THE INVENTION

1. Field of Invention

This invention relates to the sport of flyfishing, specifically to a seine net which is stored and transported on the handle of a landing net.

A seine is a section of mesh netting material which is submerged into the water in order to collect and examine insects in a river or stream. It is considered to be a fundamental tool and is generally regarded as a necessity in order to become successful in the sport. The identification of insects, particularly their size, shape, and color is of great importance to the angler. This observation process is significant since the selection of an artificial fly pattern should be based upon matching the insects which are present in the water at any given time.

2. Prior Art

There are basically two types of seines currently available, the dowel seine and the drawstring seine.

The dowel seine is a large rectangular section of mesh netting with dowels up to 2 feet long attached along opposite edges. To deploy this seine the angler wades onto the stream without his fishing rod, unrolls the netting from the dowels, and submerges the netting while holding both dowels apart. After the angler has collected and examined the insects, this process is reversed for retrieval and onshore storage of the seine. While the overall size of this seine is minimized by rolling it up, the length of the dowels makes it cumbersome to carry or transport, especially through the underbrush.

Due to its time-consuming operation, the dowel seine is usually deployed only once before the angler begins fishing, and perhaps sporadically thereafter. Since it would be unfeasible to use while the angler is wading in midstream with his fishing rod, this seine is limited to providing only single samplings of insects over a period of time. Due to the fact that insect activity is constantly changing in relation to water temperature and climactic factors, its inability to be used continuously represents its major drawback.

The second kind of seine is a drawstring style. This seine consists of an oval-shape section of netting which employs a drawstring around its perimeter. This seine is attached by laying it over the oval frame opening of a landing net, and is secured by drawing and tying the strings together on the other side of the frame.

This seine is transported in a pocket which is commonly zippered and sometimes located on the inside of the fishing vest. As a result, it can be awkward to access while holding onto the pocket, the zipper, and the fishing rod at the same time. Attaching this seine in midstream is even more cumbersome since it must be fastened with both hands while simultaneously holding onto both the the fishing rod and the net to which it attaches. After use, the net has to be untied, removed, and replaced inside a vest pocket. Since retrieving and deploying this seine is inconvenient and time-consuming, the angler cannot feasibly fish and seine for insects at the same time. As a result, this seine does not allow for the continuous capture of the different insects that will emerge and float by while the angler is fishing.

While it would be ideal to leave the drawstring seine tied onto the oval frame at all times in a readiness condition, the landing net could then not be utilized to net a fish since the seine would have to be untied and removed with both hands.

Both of these seines are carried independently and are sometimes dropped, misplaced, or lost during the seining process. Due to the steps required to retrieve and deploy them, they are totally impractical to use when varying insect conditions require an instant seining response. As a result of their overall inefficiency, especially in midstream conditions, the angler invariably concludes that any attempt to capture an insect floating downstream would not be feasible or worthwhile.

OBJECTS AND ADVANTAGES

This invention represents an improved way of transporting, accessing, and deploying a seine net. Considering the drawbacks of traditional seines, it focused on developing a seine that was more practical and efficient to use. Its primary objectives were to provide the angler with the capability to seine quickly, frequently, and conveniently.

This invention consists of a small nylon pouch inside which a fine grade of seine netting material is stored and transported in a compacted manner. Attached to a circular-shape elasticized strap, the pouch slides up a handle of a landing net and is secured to the neck of the handle with a Hook and Loop fastening design. This invention enables a seine net to be conveniently transported in its own pouch at a location which is easily accessible to the angler at all times. This neck portion location is several inches above the midsection of the handle, and does not interfere with the basic net handling operations associated with holding the net or netting a fish.

The elasticized strap in combination with the Hook & Loop fasteners allows the unit to securely adjust and adapt to the varying widths of net handles and neck area portions. The invention can be quickly attached or removed from the net handle, and utilizes materials which will not scratch or damage the finish of the wooden landing nets used in trout fishing.

After being removed from the pouch, the seine net attaches to the oval frame of the landing net for use. The steps required to attach it to the frame are significantly fewer than that of the drawstring seine. This is due to the fact that the net employs an elasticized band around a portion of its perimeter allowing it to quickly stretch, overlap, and secure to the oval frame. This tension design facilitates attachment in awkward midstream situations since it eliminates the two-handed requirement to tighten or tie any drawstrings.

The dowel and the drawstring seines are transported independently and therefore subject to misplacement or loss. Since a section of the seine netting in this invention is attached to the elastic strap at a location inside the pouch, the possibility of losing the seine before, during, or after its use is virtually eliminated. Since the invention can remain attached to the net handle at all times, it does not have to packed or accounted for before and after each outing.

Accessibility

Due to the fact that this invention remains readily available on the net handle, there is no need to search, locate, or remove it from a zippered pocket. In a midstream situation, both hands may be required to unzip an inside pocket to gain access to a drawstring seine while one hand is committed to holding the fishing rod. The seine in this invention is always conveniently located on the neck of the handle in close proximity to the frame to which it will attach.

Attachment

Deploying the drawstring seine in midstream is cumbersome and time-consuming since both hands are required to draw and tie the drawstrings while simultaneously holding on to both the fishing rod and the landing net. The elasticized netting design enables the seine to attach to the frame quickly and efficiently. The speed at which the seine can be accessed and attached provides the angler with ability to be responsive to the varying insect conditions. With the capability to seine frequently and continuously, the angler can now react spontaneously to any insect collecting opportunity. With traditional seines, the time required to access and deploy them would usually nullify any attempts to capture a targeted insect specimen floating by.

This invention can also be utilized in a way that would offer an additional benefit to the angler. The seine can remain attached to the net frame at all times while the angler is fishing, thus representing a maximum seining readiness condition. Since deployment would not be a required step, this would allow the angler to continuously scoop up any insects that may be floating downstream at any time. If the net is needed to land a fish, the angler need only lift the elasticized netting off of the frame, allowing it to snap back and retract around the handle. After netting the fish, the angler could either replace it over the net for continued use, or store it back inside the pouch compartment.

SUMMARY

The seines that are currently available are inconvenient and impractical to access and deploy. As a result, these seines cannot feasibly be used on a continuous basis, particularly when the angler is commonly fishing in midstream. The dowel seine is totally inadequate for midstream use, and the drawstring seine is cumbersome to retrieve and attach. This is due to the fact that both hands must be used to access it from a pocket, draw it over the frame, and tie the drawstrings. This must be accomplished while holding onto the seine, the fishing rod, and the landing net at the same time. They are subject to misplacement and loss, and must be accounted for when packed and unpacked. Overall, traditional seines lack the versatility to react instantly to an insect collecting opportunity.

The seine in this invention is stored and transported in a small pouch attached to the unused portion of a landing net handle. Since there is no need to locate or retrieve it for use, it remains available and conveniently accessible to the angler at all times, even under awkward stream situations. Since the netting is always in close proximity to the angler, the time required to access and deploy it is significantly less than with traditional seines. The netting material is permanently attached to the elastic strap inside the pouch thus eliminating its potential loss or misplacement. The elasticized netting band allows one-handed attachment or removal from the frame, and gives the angler the flexibility to keep the seine net fully deployed at all times. Considering its accessibility, efficiency, and ease of operation, this invention is conducive to frequent and continuous usage thereby maximizing the inherent benefits of the seining process.

DESCRIPTION OF DRAWINGS & OPERATION

Figure 1:
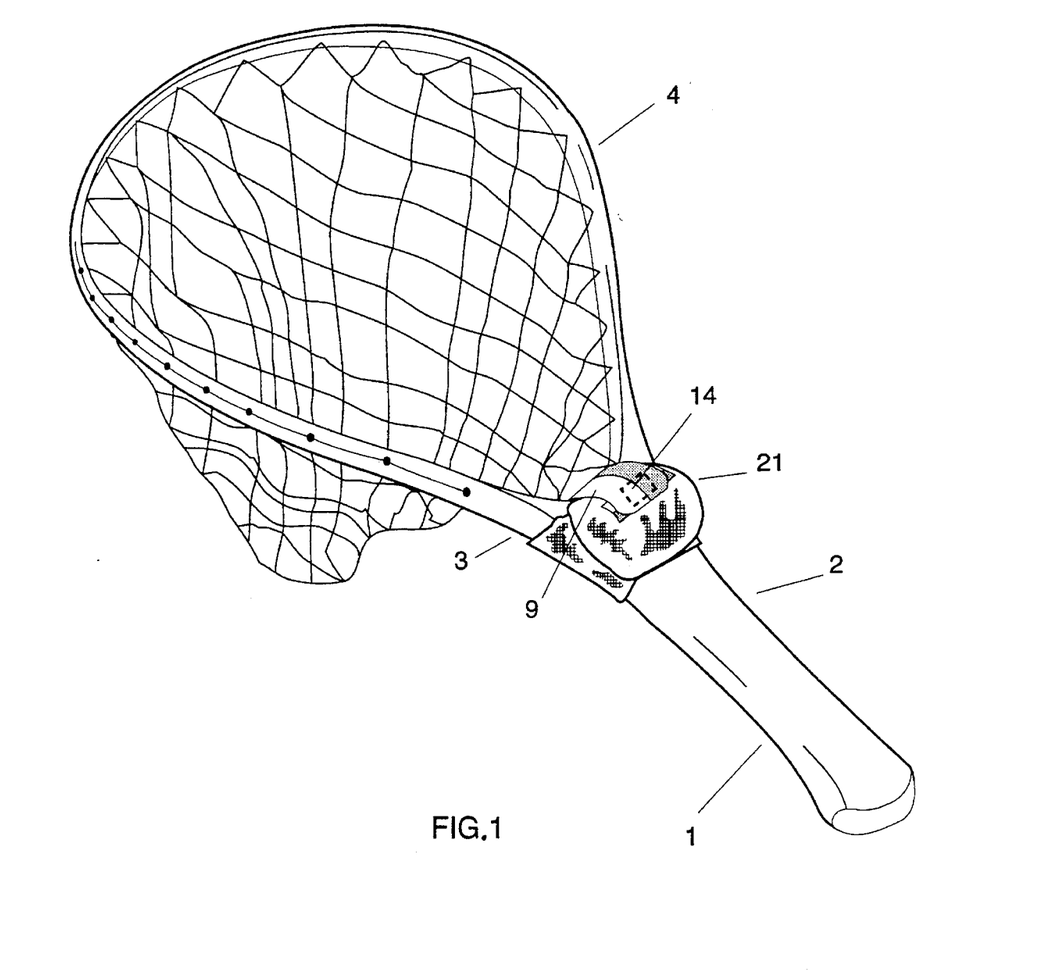
FIG. 1 shows a landing net and a front view of the invention.

A standard landing net, FIG. 1, can be considered to consist of the following sections: a net handle 1; a handle midsection 2; a location at the neck of the handle 3; and an oval frame 4.

In the description of the invention below, "H&L" has been used to designate Hook and Loop fasteners.

From the handle midsection 2 up to the neck of the handle 3, the width of the handle begins to graduate upwards whereby the neck of the handle 3 represents its greatest width. The shape of the oval frame 4 varies proportionately to the different sizes of nets that are available.

Figure 2:
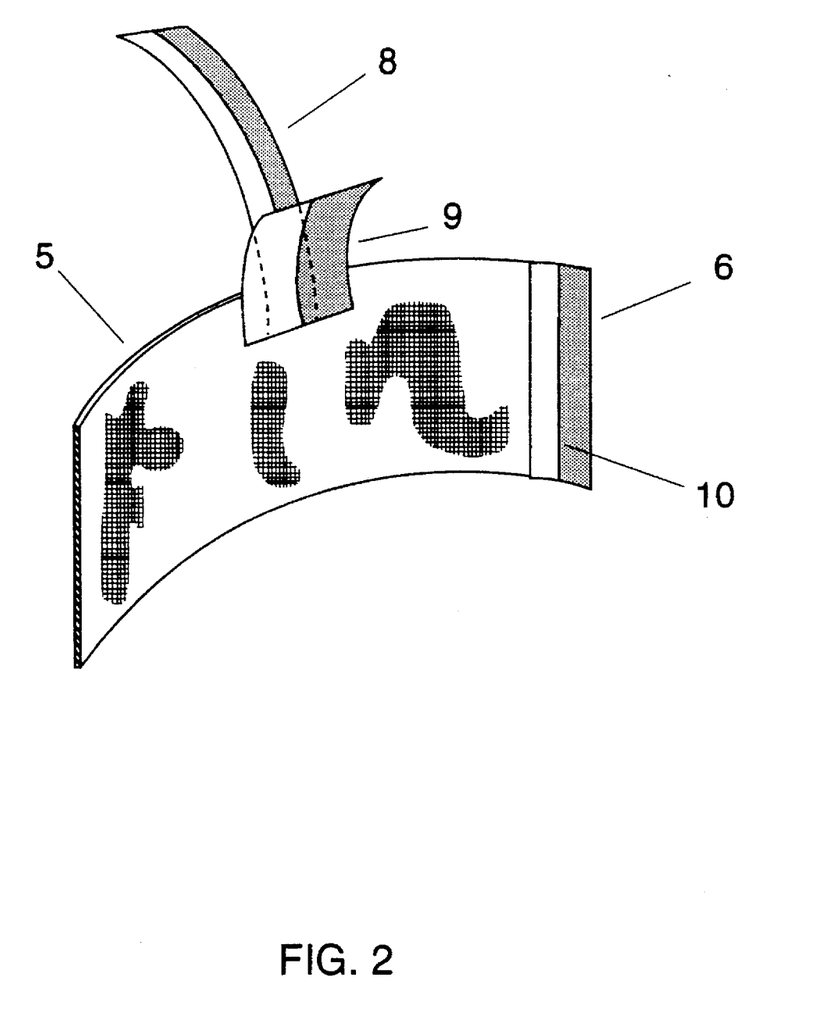
FIG. 2 shows an elastic strap with attached Hook and Loop fasteners.

An elastic strap 5, FIG. 2, is made of a cotton and elastic woven blend and is the preferred material. The elastic strap 5 can also be made of any other resilient material such as rubber in its natural form, or in combination with any material that can be woven to it. The elastic strap 5 can be of any length, width, or thickness.

On a right end of the strap 6 approximately adjacent to the end border, an H&L section 10 is attached. Approximately centered in the middle of the elastic strap 5, a long H&L strip 8 is attached. A short H&L strip 9 is positioned over the long H&L strip 8, and is attached to the elastic strap 5. All 3 H&L strips and sections can be of any length, width or thickness.

While sewing is the preferred method of attachment for these H&L strips and sections, they can also be attached with the use of heat adhesives or pressure sensitive materials. Any other fastening means such as rivets, eyelets, etc., can also be used to attach these H&L strips and sections to the elastic strap 5.

Figure 3:
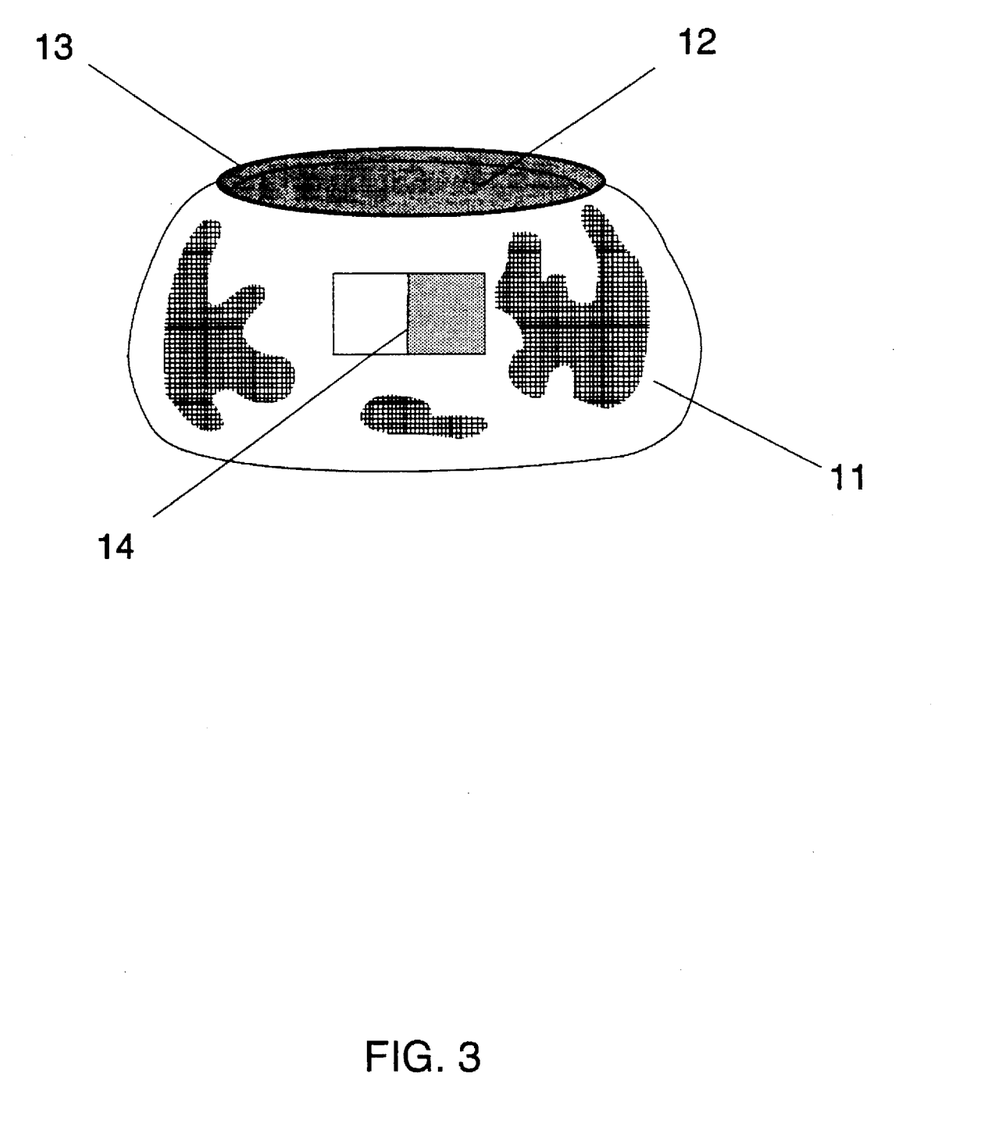
FIG. 3 shows a nylon material pouch.

FIG. 3 shows a compartment in the form of a pouch 11 made of a lightweight nylon material. The preferred material for the pouch 11 is a water-resistant, rip-stop nylon. This material was selected due to its ability to draw out moisture from inside the pouch, thereby allowing a section of seine netting 16 (FIG. 4) to dry while stored within it. Any other porous or nonporous nylon or synthetic material can be used. The pouch 11 can also be made of rubber or any elasticized material in its natural form or in combination with other woven materials. An H&L pouch strip 14 is attached to the pouch in a centered location below a pouch opening 12.

A closure elastic band 13 is sewn onto the pouch material around the circumference of the pouch opening 12. This closure elastic band 13 allows the pouch opening 12 to expand when the seine netting 16 (FIG. 4) is inserted into the pouch, and serves to secure the contents when in its constrictive form. Any length or width of closure elastic band 13 can be employed to vary either the size of the pouch opening 12 or the elasticized tension around it.

Instead of the closure elastic band 13 which is the preferred method of closure, any other closing means or materials such as H&L fasteners, snaps, etc., can be used to regulate or close the pouch opening 12.

The pouch 11 is positioned over the long H&L strip 8 and the short H&L strip 9 (FIG. 2) and is sewn onto the elastic strap 5. The pouch 11 is attached in a manner whereby a rectangular section of material is sewn onto the elastic strap 5.

In another embodiment, the pouch 11 could be attached to the elastic strap 5 with snaps or any other fasteners which would enable the pouch 11 or any other compartment to be removed and reattached. This could be desireable in an application where different items could be stored in interchageable compartments. One component of the snap or button could be attached by any means to the back of the pouch 11, and fasten to a corresponding snap on the elastic strap 5.

While the pouch 11 is the preferred choice of compartment, other embodiments employing rigid or pliable materials can be used. Any molded compartments using plastic, rubber or any other materials can also be used.

Figure 4:
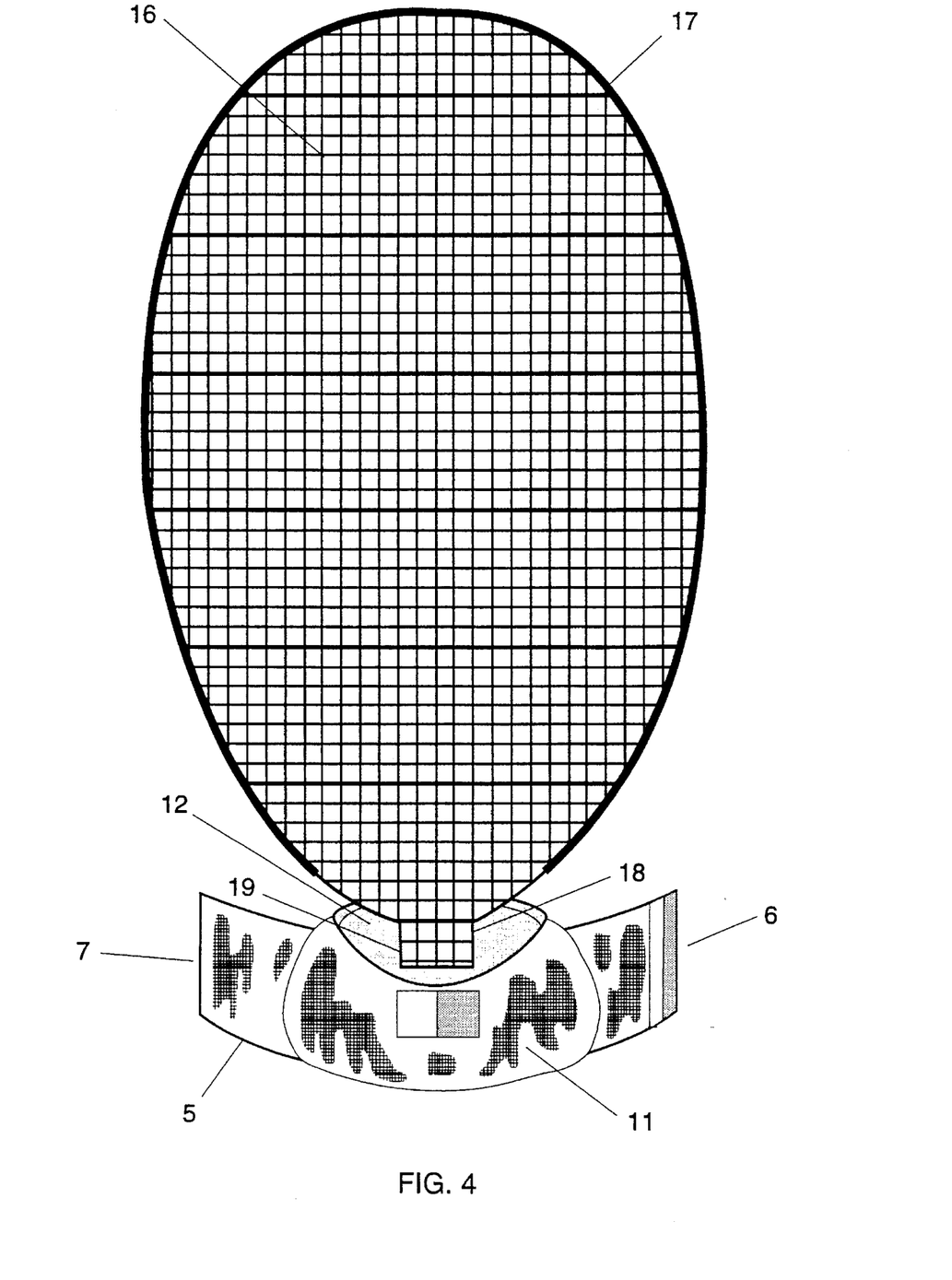
FIG. 4 shows a section of seine netting.

A section of seine netting 16, FIG. 4, is shaped in a general oval pattern. The seine netting 16 consists of a fine, lightweight nylon mesh and is the preferred choice of material based upon its water resistance, durability, and compactible properties.

A netting tongue 18 located on the bottom portion of the seine netting 16 is shaped to a width smaller than that of the pouch opening 12. This netting tongue 18 is sewn onto the elastic strap 5 at a netting attachment location 19 inside the pouch 11.

The seine netting 16 has an elasticized netting band 17 sewn onto a portion of its perimeter. This elasticized netting band 17 retains the tension of the net when it is overlapped onto the oval frame 4 (FIG. 7) of the landing net. The seine netting 16 is sewn onto the elasticized netting band 17 while the elasticized netting band 17 is in a stretched-out and extended form. When sewn in this manner, the seine netting 16 is crimped when the elasticized netting band 17 contracts, and the resultant form of the seine netting 16 is constricted and amorphous in shape.

Since it would have been difficult to render this constricted form adequately in a drawing, the seine netting 16 is depicted in its extended form presupposing that the elasticized netting band 17 has been drawn to its limits. This extended perspective of the seine netting 16 also more clearly illustrates the original shape and pattern of the seine netting 16 prior to its attachment to the elasticized netting band 17.

Figure 5:
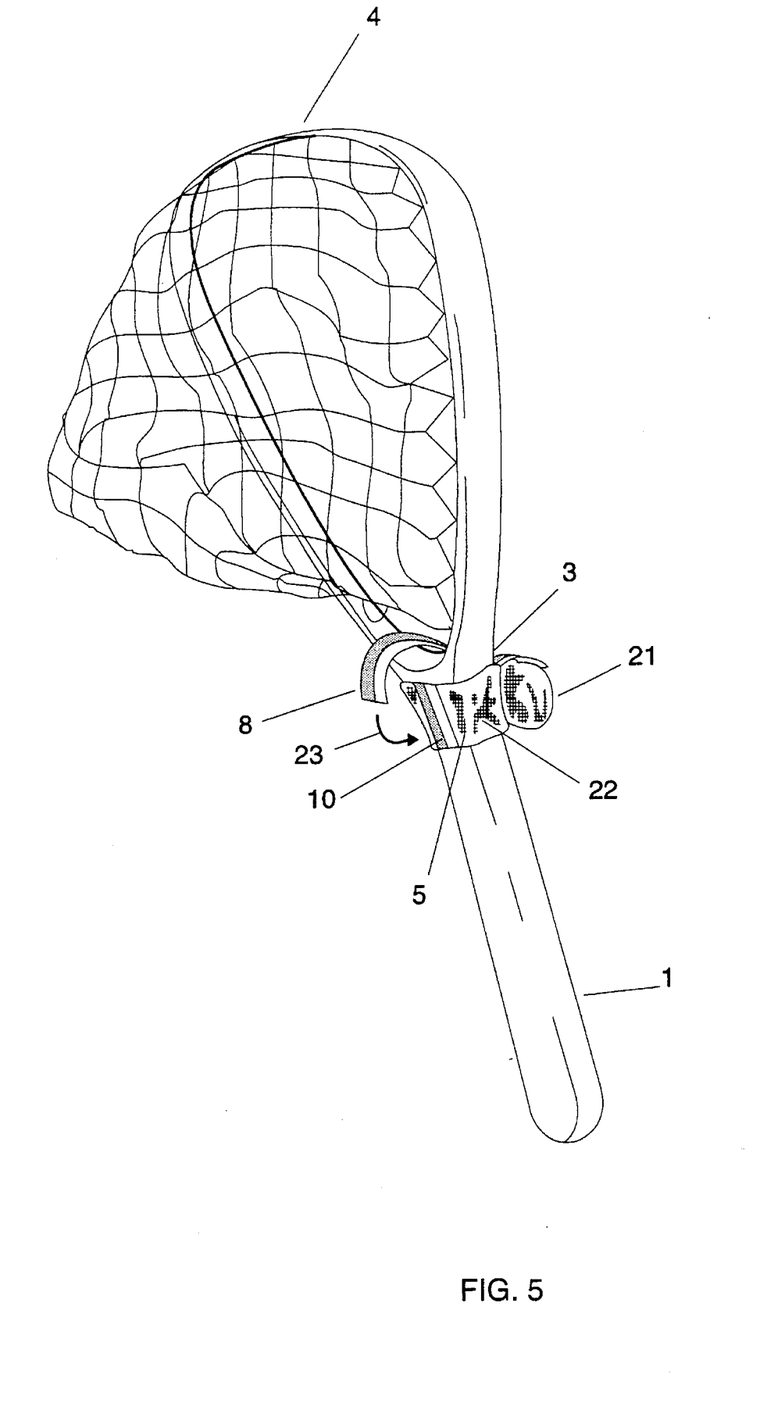
FIG. 5 shows how the invention is attached to a landing net handle.

FIG. 5 illustrates a circular strap unit 22 which is formed when the right end of the strap 6 and a left end of the strap 7 (FIG. 4) are sewn together. The attachment of these two ends can also be accomplished with a button, eyelet, H&L fasteners, etc. A full pouch 21 depicted in this drawing represents the form of the pouch 11 (FIG. 3) when the seine netting 16 (FIG. 4) is compacted and stored within it. FIG. 1 illustrates a front view of the full pouch 21 in its closure state. In the closure state, the short H&L strip 9 is fastened over the H&L pouch strip 14. In another embodiment, the short H&L strip 9 and the HUL pouch strip 14 may be omitted entirely.

To attach to the landing net, the circular strap unit 22 slides up the net handle 1 to the desired location at the neck of the handle 3. With the circular strap unit 22 positioned at the neck of the handle 3, the long H&L strip 8 is placed through the bottom of the oval frame 4 opening, and is fastened to the corresponding H&L section 10. A fastening arrow 23 indicates how the long H&L strip 8 fastens to the H&L section 10. The variable elasticity of the elastic strap 5 in combination with the variable positioning of the long H&L strip 8 over the H&L section 10 enables the circular strap unit 22 to adjust securely to varying neck of the handle 3 thicknesses and shapes.

The fastening means with which the circular strap unit 22 attaches to the neck of the handle 3 enables the circular strap unit 22 to be quickly attached or removed in a convenient manner. The elastic strap 5 and the H&L fastening materials also preclude any possible damage to the finish of some wooden landing nets. The circular strap unit 22 can be conveniently transported in a predetermined location on the neck of the handle 3 whereby the seine netting 16 can be immediately accessed for use at any time.

Another embodiment could employ a rigid strap instead of the preferred elastic strap 5 material. An H&L strap, for example, could wrap around the neck of the handle 3 in the same manner as the preferred elastic strap 5, and could fasten together with one Hook and one Loop end. Any rigid strap, however, would not offer the flexibility to adapt to varying neck of the handle 3 thicknesses and shapes.

In conjunction with this rigid strap embodiment, or as a separate embodiment, an elasticized or rubber strip could be substituted for the long H&L strip 8. This rubberized strip could be threaded through the oval frame 4 opening in the same manner as the preferred long H&L strip 8. An H&L fastener attached to the end of this rubberized strip could enable it to attach to the H&L section 10. Any fastening means such as rivets, eyelets, etc. could be used to attach this rubberized strip to the elastic strap 5.

Figure 6:
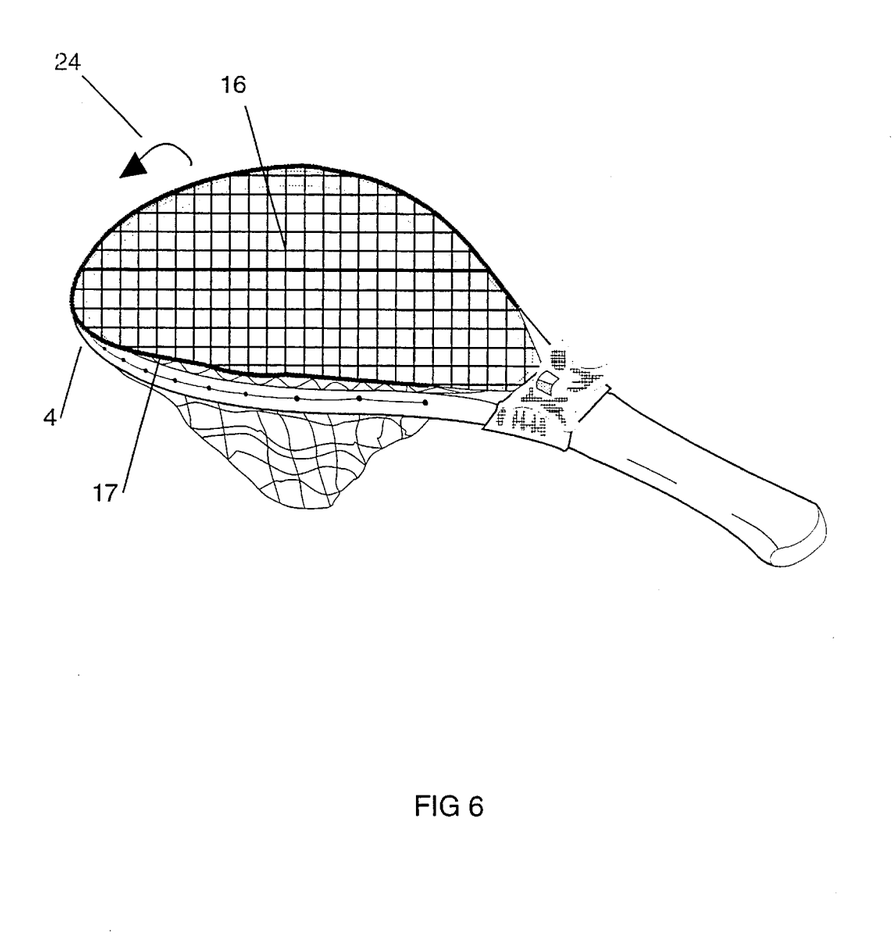
FIG. 6 shows how the seine net attaches over the oval frame.
Figure 7:
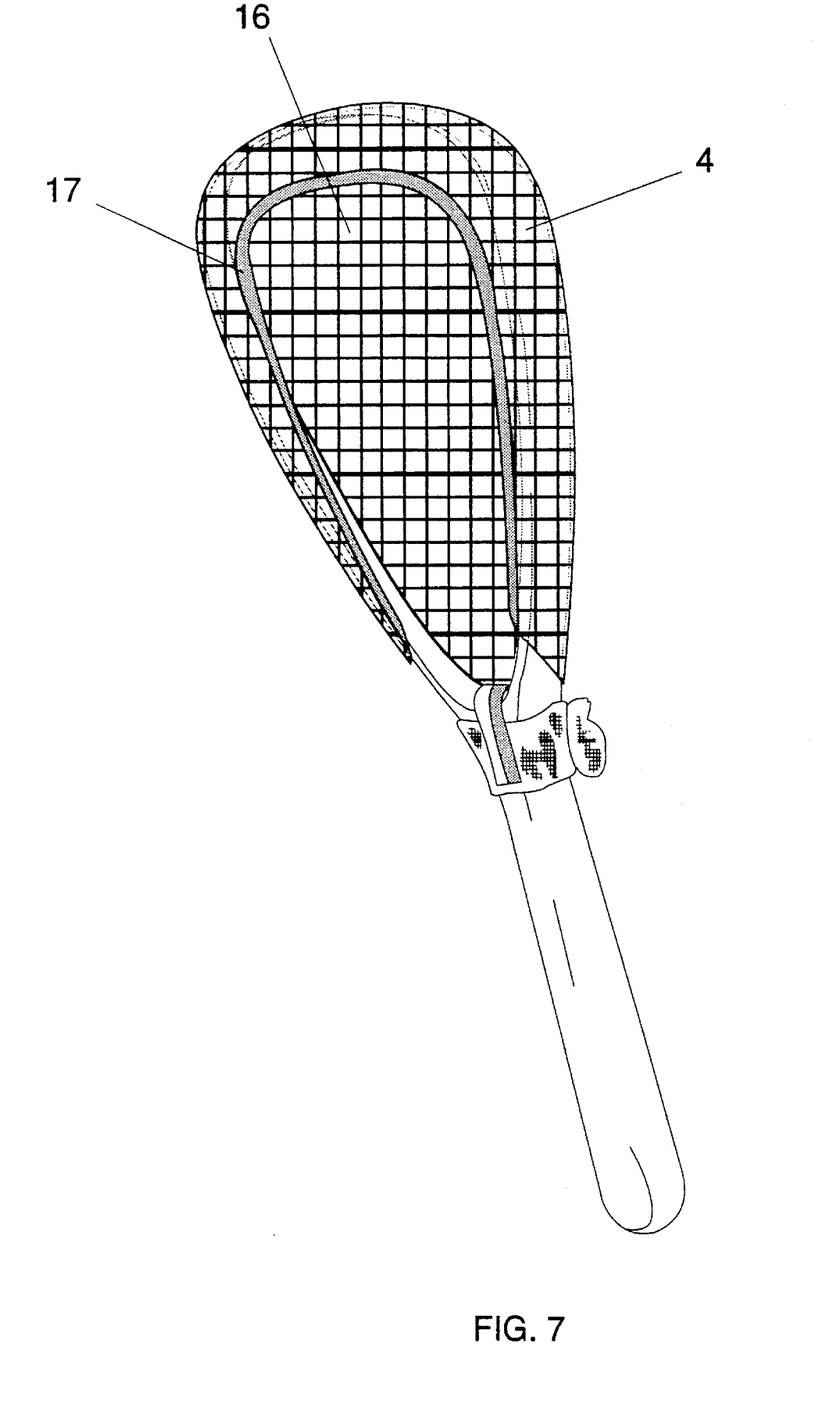
FIG. 7 shows the attached position of the seine net on the oval frame.

FIG. 6 illustrates how the seine netting 16 attaches to the oval frame 4 of the landing net. The attachment involves extending the seine netting 16 over the oval frame 4, whereby the elasticized netting band 17 overlaps the oval frame 4 and constricts the netting onto the other side of the oval frame 4. An overlapping arrow 24 indicates how the elasticized netting band 17 extends over the oval frame 4. FIG. 7 shows the secured position of the seine netting 16 after the elasticized netting band 17 is overlapped onto the oval frame 4.

This elasticized netting band 17 enables the angler to attach or remove the seine netting 16 from the oval frame 4 in a quick and efficient manner. The ease of attachment provides the angler with the flexibility to deploy the seine netting 16 repeatedly and continuously, even under awkward stream situations. The resilience of the elasticized netting band 17 also enables the seine netting 16 to adapt to different sizes and shapes of oval frame 4 openings.

This design also enables the angler to advantageously keep the seine netting 16 attached to the oval frame 4 at all times in a constant seining readiness condition. As a result, the angler can spontaneously scoop up any insects that may float by at any time. If the net is needed to land a fish, the angler can utilize the landing net by simply lifting the elasticized netting band 17 off of the oval frame 4, allowing it to retract around the neck of the handle 3. This feature represents a significant benefit to the angler, since it offers the versatility to exploit every insect gathering opportunity.

Any length of elasticized netting band 17 can be used to cover a larger or smaller perimeter portion of the seine netting 16. The perimeter of the seine netting 16 can also have an elasticized netting band 17 around its entire border.

The attachment of the elasticized netting band 17 to the seine netting 16 whereby the elasticized netting band 17 is sewn directly onto the seine netting 16 is the preferred method. In another embodiment, an elasticized netting band 17 can also be employed whereby it runs freely through a narrow enclosed fold of material which is stitched along the perimeter of the seine netting 16. In this embodiment, the two ends of the elasticized netting band 17 can be attached directly to the seine netting 16, or they can be fastened to the elastic strap 5 in proximity to the netting attachment location 19 (FIG. 4.) This latter embodiment is similar to the drawstring design but would eliminate the need to tie any strings.

Thus, the reader will see that the Net-Handle Seine provides the angler with the capability to seine quickly, efficiently, and conveniently. Its accessible location and its ease of operation permit frequent and continuous seining, advantages which were heretofore unfeasible with traditional seines.

While my above description contains several specificities, these should not be construed as limitations on the scope of the invention, but rather as amplifications of the preferred embodiments. Accordingly, the scope of the invention should be determined not by these embodiments, but by the appended claims and their legal equivalents.

GENERAL DISCUSSION

Traditional seines are awkward and time-consuming to use, particularly when the angler is fishing in midstream. Due to the required time and inconvenience associated with their use, the angler often concludes that any attempt to seine an insect floating by will be unsuccessful and futile. The fact that it is unfeasible to seine efficiently with traditional seines results in an inclination by the angler to forego the seining process entirely. This drawback greatly diminishes the angler's likelihood to succeed since it denies the capability to analyze insect specimens which will determine the selection of an appropriate artificial fly. Traditional seines are cumbersome and impractical to use on an ongoing basis, and are therefore limited in their ability to update the angler to the constantly changing insect environment.

The seine in this invention is stored in a small pouch compartment secured to the unused portion of a landing net handle. Since it does not have to be located and retrieved for use, it remains available and quickly accessible to the angler at all times. The speed with which it can be accessed and deployed contributes to its efficiency in common situations where insect capturing opportunities are brief in nature. The elasticized netting band facilitates the attachment procedure whereby the seine netting can be attached over the frame with the use of one hand.

This invention is unique in its ability to transport a seine net at a specific location on a landing net handle. Its accessibility and ease of operation make it suitable for continuous use, thereby enhancing the angler's ability to select the most effective fly pattern at any given time. Its ability to be used conveniently on a frequent basis adds an element of versatility to the seining process which has never before existed with traditional seines.

I claim:

1. A seine net which attaches to a landing net, said landing net including a handle and an oval frame comprising:

a circular strap of material;

a fastening means to attach said strap to said net handle;

a section of seine netting attached to said strap large enough to encompass said oval frame of said landing net, and a compartment attached to said strap wherein said seine netting can be stored and transported in a compacted manner.

2. The article of claim 1 wherein the material of said strap is elasticized.

3. The article of claim 1 wherein said fastening means are hook & loop fasteners.

4. The article of claim 1 wherein said seine netting employs an elasticized band around a portion of its perimeter whereby allowing said seine netting to overlap and secure to said oval frame.

5. The article of claim 1 wherein said compartment is a nylon material wherein said seine netting can be stored and transported in a compacted manner.

6. A seine net which attaches to a landing net, said landing net including a handle and an oval frame comprising:

a circular strap of elasticized material;

a fastening means employing hook & loop fasteners to attach said strap to said net handle;

a section of seine netting having a perimeter, said section of seine netting attached to said strap employing an elasticized band around a portion of said perimeter whereby said seine netting can overlap and secure to an oval frame, and a nylon material pouch compartment attached to said strap wherein said seine netting can be stored and transported in a compacted manner.

7. The article of claim 6 wherein said fastening means is an elasticized strip.

8. The article of claim 6 wherein said nylon material pouch compartment attaches to said strap with a snap fastener whereby said nylon material pouch compartment can be attached and removed.

* * * * *